US010024513B2

(12) United States Patent
Yamamoto et al.

(10) Patent No.: US 10,024,513 B2
(45) Date of Patent: Jul. 17, 2018

(54) VEHICLE LAMP UNIT AND ROTARY LIGHT SHIELDING MEMBER

(71) Applicant: KOITO MANUFACTURING CO., LTD., Tokyo (JP)

(72) Inventors: Teruaki Yamamoto, Shizuoka (JP); Akinori Matsumoto, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 156 days.

(21) Appl. No.: 15/138,575

(22) Filed: Apr. 26, 2016

(65) Prior Publication Data

US 2016/0341391 A1    Nov. 24, 2016

(30) Foreign Application Priority Data

May 22, 2015    (JP) .................................. 2015-104934

(51) Int. Cl.
*F21V 17/02*    (2006.01)
*F21S 8/10*    (2006.01)
(Continued)

(52) U.S. Cl.
CPC ........ *F21S 48/1794* (2013.01); *B60Q 1/1438* (2013.01); *F21S 41/147* (2018.01);
(Continued)

(58) Field of Classification Search
CPC ...... F21S 41/255; F21S 41/698; F21S 41/147; F21S 41/321; F21S 41/47; F21S 41/689;
(Continued)

(56) References Cited

U.S. PATENT DOCUMENTS 7,926,992 B2 *    4/2011    Kim ................... F21S 48/1794
                                                        362/283
2005/0122736 A1 *    6/2005    Watanabe ................ B60Q 1/06
                                                        362/542

FOREIGN PATENT DOCUMENTS

JP    2011-063070 A    3/2011
JP    2014-207187 A    10/2014
WO    2014-091919 A    6/2014

OTHER PUBLICATIONS

An Office Action dated Jun. 20, 2017, issued from the Korean Intellectual Property Office (KIPO), of Korean Patent Application No. 10-2016-0051658 and an English translation thereof.

* cited by examiner

*Primary Examiner* — Thien T Mai
(74) *Attorney, Agent, or Firm* — Abelman, Frayne & Schwab

(57) ABSTRACT

Provided is a vehicle lamp unit which includes an optical system configured to form a light distribution pattern ahead of a vehicle; and a rotary light shielding member configured to block at least a part of light of a light source. The rotary light shielding member includes a spiral light shielding portion formed to change a blocked quantity of light of the light source as the rotary light shielding member rotates around a rotating axis. The light shielding portion is configured to form a plurality of light distribution patterns such that a position of a cutoff line extending in a direction crossing a horizontal direction changes in the horizontal direction. Further, the light shielding portion is configured such that a change of a position of an edge portion projected as a cutoff line becomes nonlinear in relation to a change of a rotational position of the rotary light shielding member.

15 Claims, 9 Drawing Sheets

(51) Int. Cl.
  *F21S 41/698* (2018.01)
  *B60Q 1/14* (2006.01)
  *F21S 41/147* (2018.01)
  *F21S 41/155* (2018.01)
  *F21S 41/255* (2018.01)
  *F21S 41/275* (2018.01)
  *F21S 41/47* (2018.01)
  *F21S 45/47* (2018.01)

(52) U.S. Cl.
  CPC ........... *F21S 41/155* (2018.01); *F21S 41/255* (2018.01); *F21S 41/275* (2018.01); *F21S 41/47* (2018.01); *F21S 41/698* (2018.01); *B60Q 2300/122* (2013.01); *B60Q 2300/124* (2013.01); *B60Q 2300/40* (2013.01); *F21S 45/47* (2018.01)

(58) Field of Classification Search
  CPC .......... F21S 45/47; F21S 41/36; F21S 41/365; F21S 41/37; F21S 41/635; F21S 41/675; F21S 41/683; F21S 41/695; F21S 48/1794; F21S 41/155; F21S 41/162; F21S 41/172
  See application file for complete search history.

36

VEHICLE LAMP UNIT AND ROTARY LIGHT SHIELDING MEMBER

CROSS-REFERENCE TO RELATED APPLICATIONS

This application is based on and claims priority from Japanese Patent Application No. 2015-104934, filed on May 22, 2015, with the Japan Patent Office, the disclosure of which is incorporated herein in its entirety by reference.

TECHNICAL FIELD

The present disclosure relates to a vehicle lamp unit and a rotary light shielding member.

BACKGROUND

Conventionally, a lamp unit has been known which includes a part called a rotary shade. A rotary shade has been conceived which includes a twisted end surface which extends around a rotating axis so as to connect different positions in relation to the direction of the rotating axis (see, e.g., WO 14/091919). The twisted end surface is a portion that is projected as a boundary of a non-illuminated area which is formed partially within a high beam pattern. In the lamp unit provided with such a rotary shade, a position of the twisted end surface to be projected changes in the direction of the rotating axis as the rotary shade rotates so that it is possible to change a position of a boundary of a non-illuminated area, that is, a position or a size of a non-illuminated area without performing a swivel control.

SUMMARY

In the case of changing a position or a size of a non-illuminated area by rotating a rotary shade, when a shape (cutoff line) of a boundary between an illuminated area and a non-illuminated area largely changes, it may cause a driver to feel uncomfortable in visibility. Further, when a shape of a cutoff line largely changes, a non-illuminated area is required to expand in order to preferentially restrict a glare toward a preceding vehicle or pedestrian. In such a case, the forward visibility may be deteriorated.

The present disclosure has been made in view of the circumstances described above, and an object thereof is to provide a new technology in consideration of the glare restriction and the forward visibility improvement.

In order to solve the above-described problems, a vehicle lamp unit of an aspect of the present disclosure includes an optical system configured to form a light distribution pattern ahead of a vehicle; and a rotary light shielding member configured to block at least a part of light of a light source. The rotary light shielding member includes a spiral light shielding portion formed to change a blocked quantity of light of the light source as the rotary light shielding member rotates around a rotating axis. The light shielding portion is configured to form a plurality of light distribution patterns such that a position of a cutoff line extending in a direction crossing a horizontal direction changes in the horizontal direction. Further, the light shielding portion is configured such that a change of a position of an edge portion projected as a cutoff line becomes nonlinear in relation to a change of a rotational position of the rotary light shielding member.

According to this aspect, it is possible to suppress a driver from feeling uncomfortable with a movement or a shape change of a cutoff line in relation to a change of a rotational position of a rotary shade. Further, the cutoff line may be inclined or perpendicular to a horizontal direction.

The light shielding portion may be configured to form a first light distribution pattern, a second light distribution pattern, and a third light distribution pattern as the plurality of light distribution patterns. The light shielding portion may include a first edge portion that is projected as a first cutoff line of the first light distribution pattern in a first rotational position R1 of the rotary light shielding member, a second edge portion that is projected as a second cutoff line of the second light distribution pattern in a second rotational position R2 (R1<R2) of the rotary light shielding member which is further rotated from the first rotational position R1, and a third edge portion that is projected as a third cutoff line of the third light distribution pattern in a third rotational position R3 (R2<R3) of the rotary light shielding member which is further rotated from the second rotational position R2. The light shielding portion may be configured such that a ratio $\Delta H/\Delta R$ of a change $\Delta H$ from the first edge portion to the second edge portion in a direction of a rotating axis to a rotational change $\Delta R$ from the second rotational position R1 to the second rotational position R2 is different from a ratio $\Delta H'/\Delta R'$ of a change $\Delta H'$ from the second edge portion to the third edge portion in the direction of the rotating axis to a rotational change $\Delta R'$ from the second rotational position R2 to the third rotational position R3. Accordingly, a change of a shape of a cutoff line may be restricted.

The light shielding portion may be configured such that an area illuminated by the second light distribution pattern becomes larger than an area illuminated by the first light distribution pattern and narrower than an illuminated area by the third light distribution pattern, and may meet the condition of the ratio $\Delta H/\Delta R$<the ratio $\Delta H'/\Delta R'$. Accordingly, when forming, for example, the second light distribution pattern, a shape of the second cutoff line may be suppressed from changing as the third edge portion corresponding to the third cutoff line of the third light distribution pattern is projected.

The light shielding portion may be configured such that, assuming that a spiral surface which has a constant ratio $\Delta H''/\Delta R''$ of a change $\Delta H''$ from the first edge portion to the third edge portion in the direction of the rotating axis to of a rotational change $\Delta R''$ from the first rotational position R1 to the third rotational position R3 is an imaginary surface $\alpha$, an angle $\theta 1$ formed between a first light shielding surface P1 extending from the first edge portion to the second edge portion and the imaginary surface $\alpha$ is equal to or less than an angle $\theta 2$ formed between a second light shielding surface P2 extending from the second edge portion to the third edge portion and the imaginary surface $\alpha$.

The optical system may include a projection lens. The rotary light shielding member is disposed near a focal point of the projection lens. The light shielding portion is a light shielding surface which is curved about the second edge portion and may be configured such that a lower end of the second cutoff line which is formed ahead of a vehicle when the second edge portion is projected in the second rotational position R2 is disposed in a range of $\pm X_H°$ in a horizontal direction with reference to an optical axis [wherein $X_H$ is equal to or less than an angular difference $X_V$ between the lower end of the second cutoff line and the line H-H (a horizontal line)]. Accordingly, the second cutoff line near the optical axis may be formed accurately.

Another aspect of the present disclosure provides a rotary light shielding member that is capable of blocking at least a part of light of a light source in a vehicle lamp unit. The rotary light shielding member includes a spiral light shielding portion that is formed to change a blocked quantity of the light of the light source as the rotary light shielding member rotates around a rotational axis. The light shielding portion is configured to form a plurality of light distribution patterns such that a position of a cutoff line extending toward a direction crossing a horizontal direction changes in the horizontal direction. Further, the light shielding portion is configured such that a change of a position of an edge portion projected as a cutoff line becomes nonlinear in relation to a change of a rotational position of the rotary shade.

According to this aspect, it is possible to suppress a driver from feeling uncomfortable with a movement of a cutoff line in relation to a change of a rotational position of the rotary shade.

In addition, any combinations of the above-described components and modifications to the expressions of the present disclosure which are related to, for example, parts, control methods, and systems, are also effective as aspects of the present disclosure.

According to the present disclosure, it is possible to provide a new technology which considers the glare restriction and the forward visibility improvement.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Hereinafter, a preferred exemplary embodiment of the present disclosure will be described with reference to the accompanying drawings. Identical or corresponding components, members, and processes in each of the drawings will be denoted by the same symbols, and overlapping descriptions thereof will be appropriately omitted. Further, the exemplary embodiment is not intended to limit the present disclosure thereto, but is merely exemplary. All features described in the exemplary embodiment or combinations thereof may not be essential for the present disclosure. In addition, the terms "left" and "right" used in the descriptions hereinafter refer to a left direction and a right direction, respectively, when viewed from the driver's seat.

Figure 1:
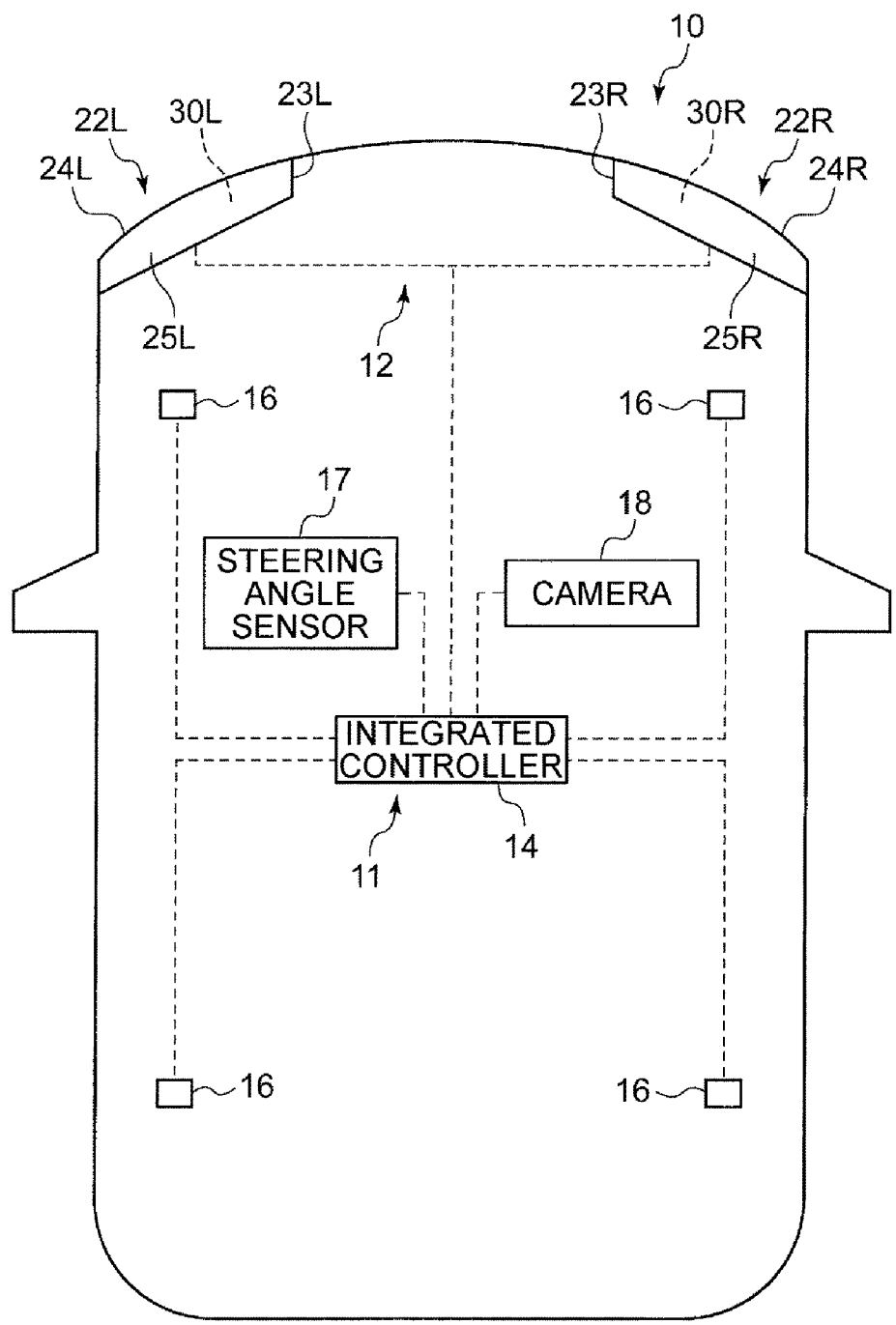
FIG. 1 is a view schematically illustrating an entire configuration of a vehicle mounted with a headlamp device according to an exemplary embodiment of the present disclosure.

FIG. 1 is a view schematically illustrating an entire configuration of a vehicle 10 mounted with a headlamp device 12 according to an exemplary embodiment of the present disclosure. The headlamp device 12 makes up a headlamp control system 11 together with an integrated controller 14, wheel speed sensors 16, a steering angle sensor 17, and a camera 18.

The integrated controller 14 includes, for example, a central processing unit (CPU) which executes various arithmetic operations, a read-only memory (ROM) which stores various control programs, and a random-access memory (RAM) which is used as a working area for storing data or executing programs, and performs various controls in the vehicle 10.

The wheel speed sensors 16 are provided to correspond to four wheels of left and right front wheels and left and right rear wheels which are assembled to the vehicle 10, respectively. The wheel speed sensors 16 are connected individually to the integrated controller 14 so as to communicate therewith and output signals corresponding to rotating speeds of the corresponding wheels to the integrated controller 14. The integrated controller 14 calculates the speed of the vehicle 10 by using the signals input from the wheel speed sensors 16.

The steering angle sensor 17 is provided on a steering wheel and connected to the integrated controller 14 so as to communicate therewith. The steering angle sensor 17 outputs a signal corresponding to the steering angle of the steering wheel which is rotated by a driver to the integrated controller 14. The integrated controller 14 calculates the traveling direction of the vehicle 10 by using the signal input from the steering angle sensor 17.

The camera 18 includes an imaging device such as, for example, a charged coupled device (CCD) sensor or a complementary metal oxide semiconductor (CMOS) sensor, and generates image data by capturing an image ahead of the vehicle. The camera 18 is connected to the integrated controller 14 so as to communicate therewith, and the generated image data are output to the integrated controller 14.

The headlamp device 12 includes a right headlamp unit 22R that is disposed near the front right side of the vehicle 10 and a left headlamp unit 22L that is disposed near the front left side of the vehicle 10. In the right headlamp unit 22R, a light transmitting cover 24R is mounted on a lamp body 23R to define a lamp compartment 25R.

Figure 2:
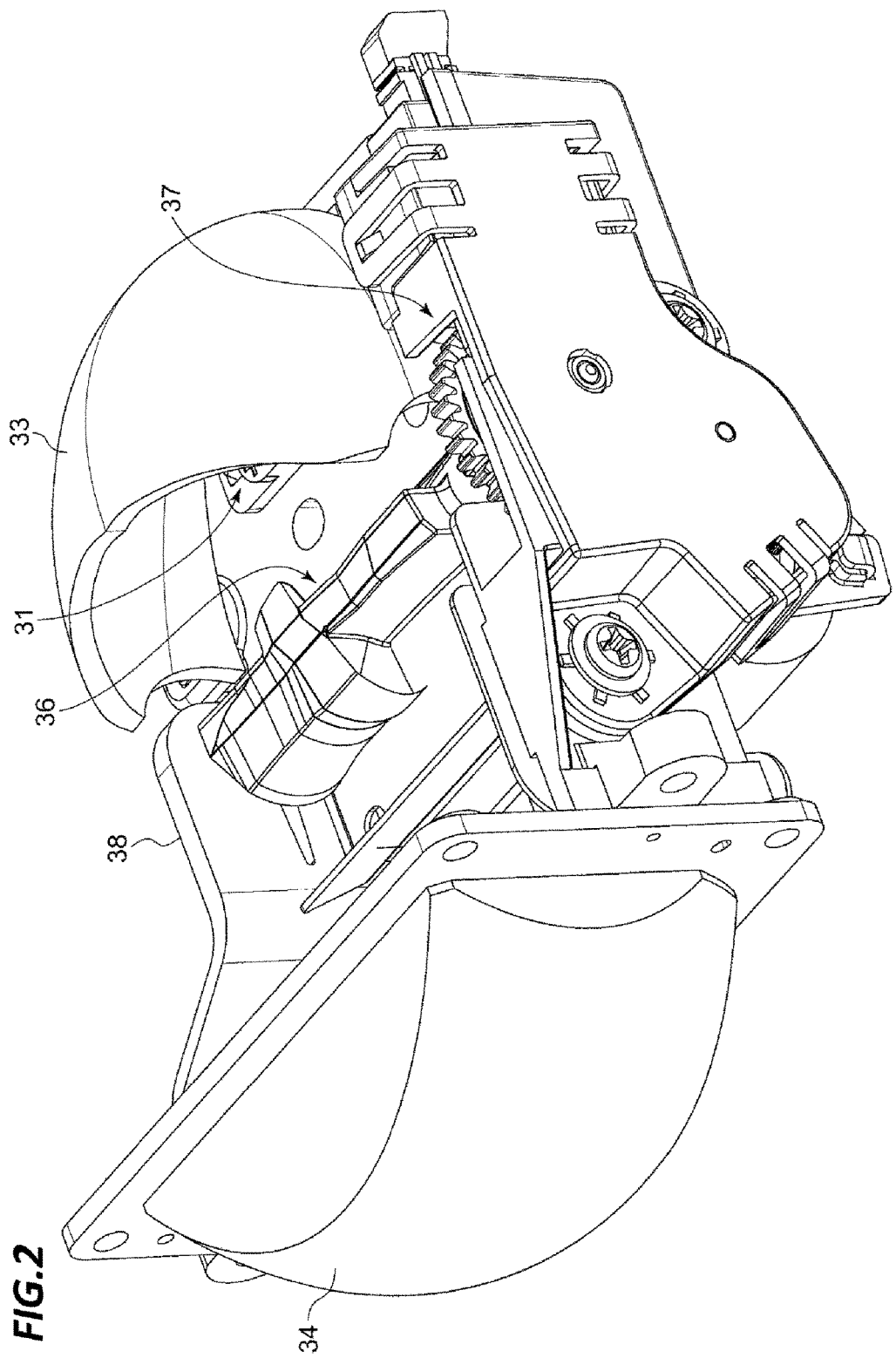
FIG. 2 is a perspective view illustrating a schematic configuration of a vehicle lamp unit according to an exemplary embodiment of the present disclosure.
Figure 3:
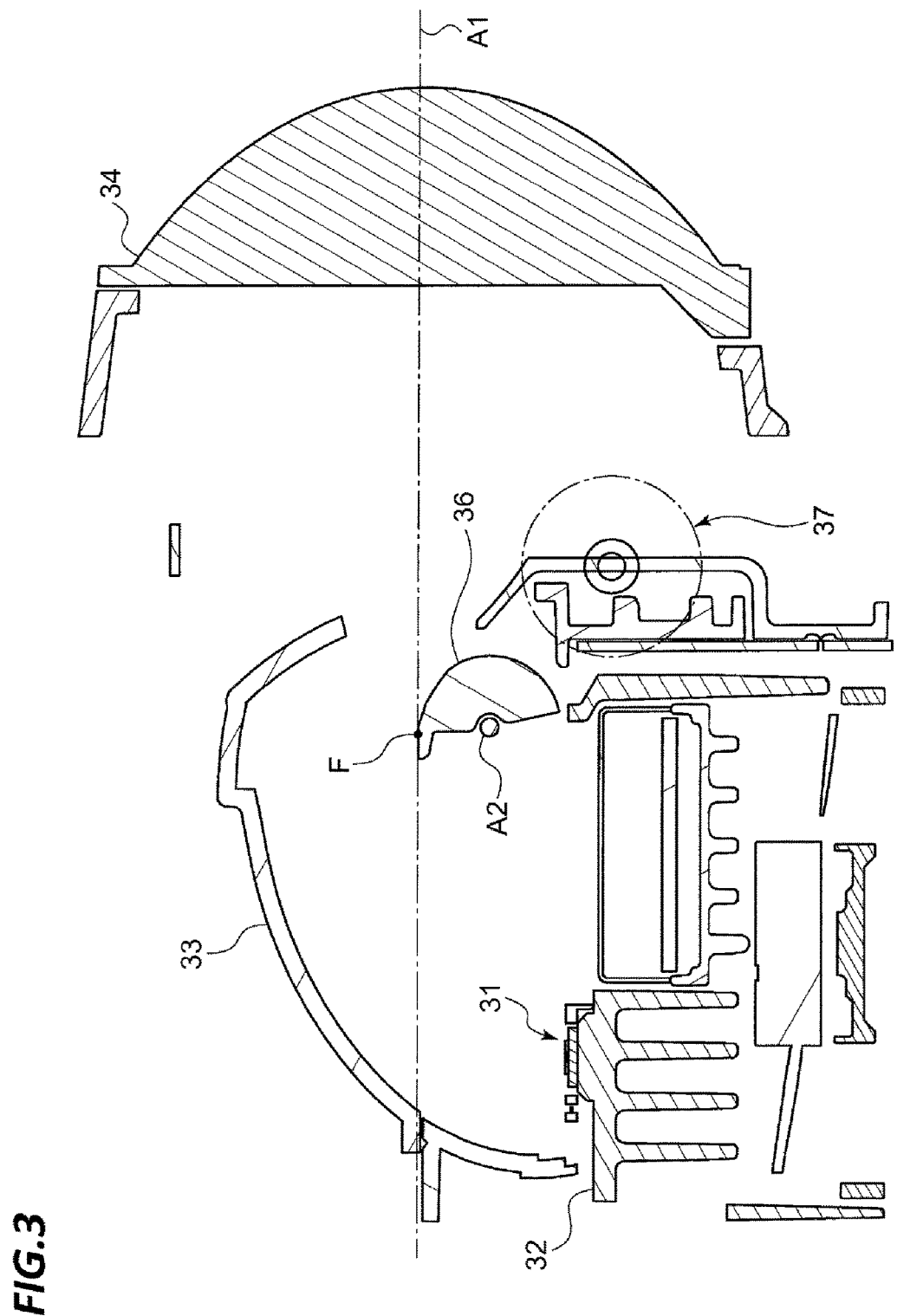
FIG. 3 is a cross-sectional view of the vehicle lamp unit according to the exemplary embodiment of the present disclosure.

FIG. 2 is a perspective view illustrating a schematic configuration of a vehicle lamp unit according to an exemplary embodiment of the present disclosure. FIG. 3 is a cross-sectional view of the vehicle lamp unit according to the exemplary embodiment of the present disclosure. The right lamp unit 30R illustrated in FIGS. 2 and 3 includes a light source 31, a heat sink 32, a reflector 33, a projection lens 34, a right rotary shade 36, a driving mechanism 37, and a support 38.

The light source 31 is a semiconductor light emitting device such as, for example, a white light emitting diode (LED) and an organic electro-luminescence (EL) device. The light source 31 is fixed to the heat sink 32. The heat sink 32 is formed of a material and in a shape which are suitable for dissipating heat generated from the light source 31. Light emitted from the light source 31 is reflected by the reflector 33 to travel toward the front side. At least a part of the light passes through the projection lens 34 that is disposed in the front of the reflector 33.

The reflector 33 includes a reflecting surface that is formed based on a substantially elliptical surface of which a central axis is an optical axis A1 that extends in a front-to-rear direction of the vehicle 10. The light source 31 is disposed at a first focal point of an ellipse which makes up a vertical cross section of the reflecting surface. Accordingly, light emitted from the light source 31 converges on a second focal point of the ellipse.

The projection lens 34 is made of a resin and is a planoconvex aspheric lens of which a front surface is convex and a rear surface is flat. The projection lens 34 is disposed such that a rear focal point F coincides with the second focal point of the reflecting surface of the reflector 33, and configured to project an image on the rear focal point F to the front side of the vehicle 10 as an inverted image.

Figure 4:
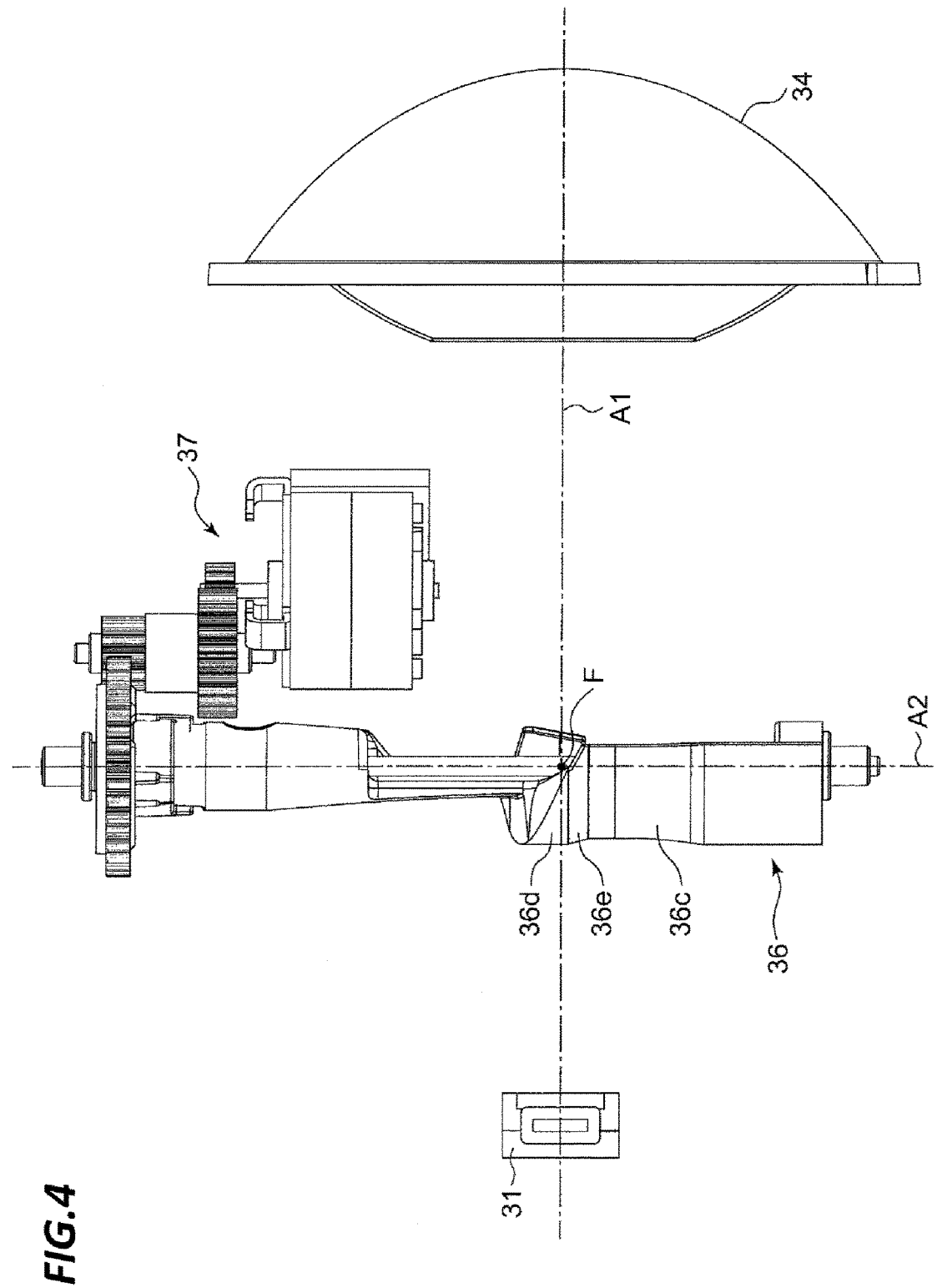
FIG. 4 is a plan view illustrating a positional relationship among some of components of a right lamp unit.

FIG. 4 is a plan view illustrating a positional relationship among some of the components of the right lamp unit 30R. The right rotary shade 36 is disposed behind the projection lens 34 so as to block a part of light emitted from the light source 31. The right rotary shade 36 has a rotating axis A2 and is disposed such that the rotating axis A2 passes below the rear focal point F of the projection lens 34.

The driving mechanism 37 is fixed to the axial left end of the right rotary shade 36. The driving mechanism 37 includes a motor and a gear mechanism, and rotates the right rotary shade 36 around the rotating axis A2. Specifically, the motor and the gear mechanism are driven in response to a control signal that is input from the unified controller 14 of the vehicle 10, so as to rotate the right rotary shade 36 at an angle and in a direction according to the signal. As illustrated in FIG. 2, the support 38 rotatably supports the axial right end of the right rotary shade 36.

As described above, the right lamp unit 30R according to the present exemplary embodiment includes the optical system configured to form a light distribution pattern ahead of a vehicle, and the right rotary shade 36 capable of blocking at least a part of light of the light source 31.

Figure 5A:
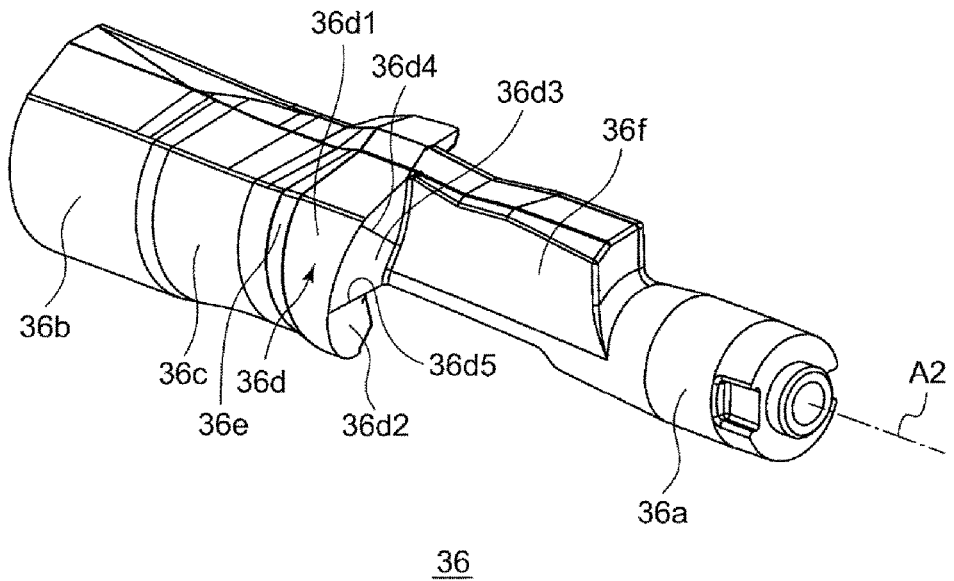
FIG. 5A is a perspective view illustrating an external appearance of a right rotary shade.
Figure 5B:
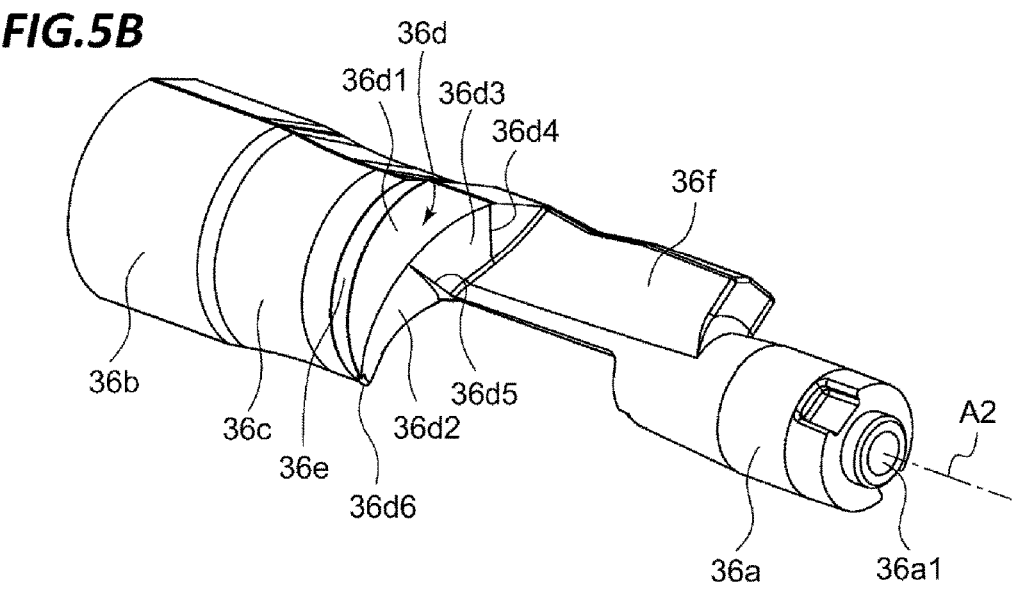
FIG. 5B is a perspective view illustrating an external appearance of the right rotary shade in a rotational position which is different from that in FIG. 5A.

FIG. 5A is a perspective view illustrating an external appearance of the right rotary shade 36, and FIG. 5B is a perspective view illustrating an external appearance of the right rotary shade 36 in a rotational position which is different from that in FIG. 5A. As will be described in detail later, the right rotary shade 36 is shaped to include circumferential surfaces and end surfaces which enable differently shaped end edges to be disposed at the rear focal point F of the projection lens 34 depending on a rotational angle at which the right rotary shade 36 is driven by the driving mechanism 37.

Light emitted from the light source 31 is reflected by the reflector 33 to travel toward the front side. A part of the light is blocked by the right rotary shade 36. At this time, a shape of an end edge disposed at the rear focal point F of the projection lens 34 is projected as a part of a circumferential edge of a light distribution pattern which is formed ahead of the vehicle 10.

As illustrated in FIGS. 5A and 5B, the right rotary shade 36 includes a left cylindrical portion 36a, a right cylindrical portion 36b, a first connecting portion 36c, a second connecting portion 36d, a third connecting portion 36e, and a fourth connecting portion 36f.

The left cylindrical portion 36a has a cross-sectional shape that is formed of concentric circles which are centered at the rotating axis A2 when viewed from the direction following the rotating axis A2. The left cylindrical portion 36a is formed with an axial opening 36a1, and this axial opening 36a1 is coaxial with the rotating axis A2. The axial opening 36a1 is connected with the driving mechanism 37. The right cylindrical portion 36b has a cross section which looks like a concentric circle which is centered at the rotating axis A2 when viewed from the direction following the rotating axis A2.

The first connecting portion 36c is a portion which is formed continuously to the right cylindrical portion 36b and disposed at the left side of the right cylindrical portion 36b when viewed from the driver's seat. The first connecting portion 36c has a cross-sectional shape that is formed of concentric semi-circles which are centered at the rotating axis A2 when viewed from the direction following the rotating axis A2.

The second connecting portion 36d is a portion which is disposed at the left side of the first connecting portion 36c when viewed from the driver's seat, and includes a cylindrical portion 36d1, a first spiral surface 36d2, and a second spiral surface 36d3. The cylindrical portion 36d1 has a cross-sectional shape which is based on shape that is formed of concentric semi-circles which are centered at the rotating axis A2 when viewed from the direction following the rotating axis A2 and exhibits a shape which is partially notched by the first spiral surface 36d2 and the second spiral surface 36d3.

The third connecting portion 36e is a portion which is formed continuously between the first connecting portion 36c and the cylindrical portion 36d1 of the second connecting portion 36d to connect them together. That is, the third connecting portion 36e is a surface which extends around the rotating axis A2 so as to connect a semi-cylindrical circumferential surface which is formed by the first connecting portion 36c with a circumferential surface which is formed by the cylindrical portion 36d1 of the second connecting portion 36d, and is inclined along the direction of the rotating axis A2. As also illustrated in FIG. 4, the third connecting portion 36e is disposed such that the boundary between the second connecting portion 36d and the third connecting portion 36e passes through the rear focal point F of the projection lens 34 or the vicinity thereof.

The fourth connecting portion 36f is a portion which is formed continuously to the left cylindrical portion 36a and the second spiral surface 36d3 of the second connecting portion 36d to connect them together.

The right rotary shade 36 according to the present exemplary embodiment may form a low beam pattern which illuminates a near area ahead of a vehicle so as not to cause a glare to an oncoming vehicle or a high beam pattern which illuminates an area expanding far ahead of a vehicle. Further, the right rotary shade 36 may form a light distribution pattern which achieves both the glare restriction and the assurance of front visibility by setting only an area where a vehicle or a pedestrian is detected to be present ahead of a vehicle, as a non-illuminated area in the state in which high beams are irradiated. Herein, such a light distribution pattern will be referred to as a "partial high beam pattern."

Since a method of forming a low beam pattern or a high beam pattern by using a rotary shade is well-known, descriptions thereof will be omitted. Hereinafter, descriptions will be made mainly on a case where a partial high beam pattern is formed by using the rotary shade according to the present exemplary embodiment.

The right rotary shade 36 according to the present exemplary embodiment is a rotary light shielding member that is capable of blocking at least a part of light of a light source in a vehicle lamp unit. The right rotary shade 36 includes a spiral light shielding portion (the second connecting portion 36d) that is formed to change the blocked quantity of light emitted from the light source 31 as the right rotary shade 36 rotates around the rotating axis.

The second connecting portion 36d is configured such that a plurality of light distribution patterns can be formed in which a position of a cutoff line extending toward a direction crossing a horizontal direction (in an upwardly inclined direction in the present exemplary embodiment) changes in the horizontal direction. Further, the second connecting portion 36d is configured such that a change of a position of an edge portion which is projected as a cutoff line becomes nonlinear in relation to a change of a rotational position of the right rotary shade 36.

Figure 6A:
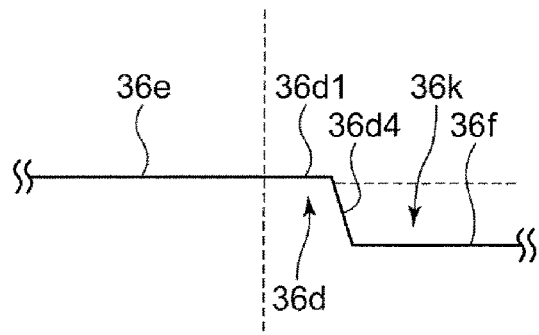
FIG. 6A is a schematic view illustrating a state of the vicinity of a second connecting portion of the right rotary shade in a rotational position R1 when viewed from the front side of a vehicle.
Figure 6D:
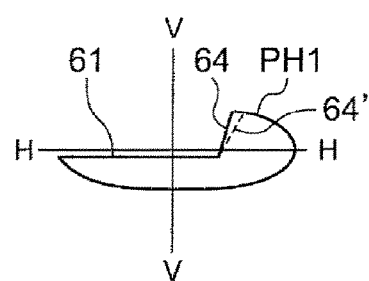
FIG. 6D is a view illustrating a light distribution pattern formed by the right rotary shade illustrated in FIG. 6A.
Figure 6B:
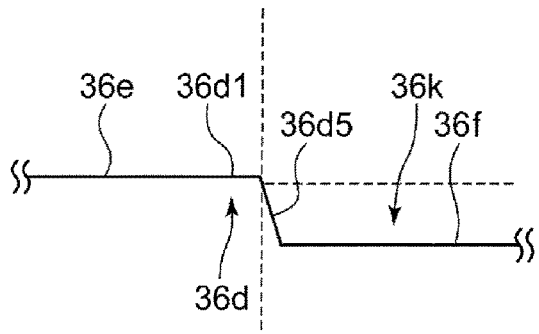
FIG. 6B is a schematic view illustrating a state of the vicinity of the second connecting portion of the right rotary shade in a rotational position R2 when viewed from the front side of a vehicle.
Figure 6E:
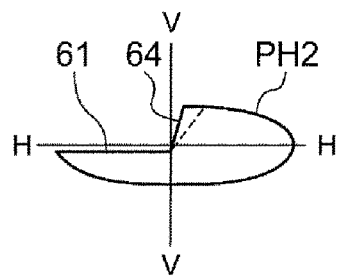
FIG. 6E is a view illustrating a light distribution pattern formed by the right rotary shade illustrated in FIG. 6B.
Figure 6C:
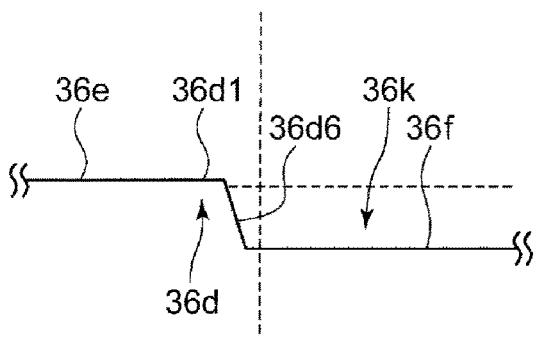
FIG. 6C is a schematic view illustrating a state of the vicinity of the second connecting portion of the right rotary shade in a rotational position R3 when viewed from the front side of the vehicle.
Figure 6F:
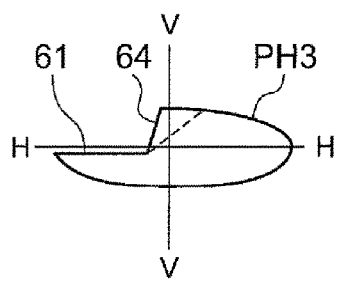
FIG. 6F is a view illustrating a light distribution pattern formed by the right rotary shade illustrated in FIG. 6C.

FIG. 6A is a schematic view illustrating a state of the vicinity of the second connecting portion 36d of the right rotary shade 36 in the rotational position R1 when viewed from the front side of the vehicle 10. FIG. 6B is a schematic view illustrating a state of the vicinity of the second connecting portion 36d of the right rotary shade 36 in the rotational position R2 when viewed from the front side of the vehicle 10. FIG. 6C is a schematic view illustrating a state of the vicinity of the second connecting portion 36d of the right rotary shade 36 in the rotational position R3 when viewed from the front side of the vehicle 10. FIG. 6D is a view illustrating a light distribution pattern formed by the right rotary shade 36 illustrated in FIG. 6A. FIG. 6E is a view illustrating a light distribution pattern formed by the right rotary shade 36 illustrated in FIG. 6B. FIG. 6F is a view illustrating a light distribution pattern formed by the right rotary shade 36 illustrated in FIG. 6C.

The second connecting portion 36d functioning as a light shielding portion includes a first edge portion 36d4 that is projected as an inclined cutoff line 64 of a right partial beam pattern PH1 illustrated in FIG. 6D in the first rotational position R1 of the right rotary shade 36 illustrated in FIG. 6A. The first edge portion 36d4 is formed on the end surface of the cylindrical second connecting portion 36d in the direction of the rotating axis A2. Further, the first edge portion 36d4 has a shape of a straight line that forms one side of the second spiral surface 36d3 in the diametrical direction.

In the state illustrated in FIG. 6A, the outer peripheral portion of the third connecting portion 36e, the outer peripheral portion of the cylindrical portion 36d1 of the second connecting portion 36d, the first edge portion 36d4 that is obliquely formed, and a part of the upper surface of the fourth connecting portion 36f appear on the upper end portion of the right rotary shade 36.

The light distribution pattern illustrated in FIG. 6D is formed as the outer peripheral portion of the third connecting portion 36e, the cylindrical portion 36d1, and the first edge portion 36d4 are projected to an imaginary vertical screen which is disposed ahead of the vehicle 10. This light distribution pattern corresponds to a right partial high beam pattern PH1 and has an illuminated area which is larger than that of a right low beam pattern and narrower than that of a right high beam pattern.

The right partial high beam pattern PH1 includes a horizontal cutoff line 61 and an inclined cutoff line 64.

The horizontal cutoff line 61 is formed by the third connecting portion 36e and the upper edge of the cylindrical portion 36d1 to extend horizontally slightly below the horizontal line H-H, and used as a cutoff line for an own lane side and a cutoff line for an oncoming lane side.

The inclined cutoff line 64 is formed by the first edge portion 36d4 of the second spiral surface 36d3 and extends obliquely toward the right upper side from the right end of the horizontal cutoff line 61.

As illustrated in FIG. 6A, a space 36k which enables light to pass therethrough is formed in the left side of the first edge portion 36d4 when viewed from the driver's seat. Light which has passed through the space 36k illuminates the right area of the inclined cutoff line 64, as illustrated in FIG. 6D.

That is, when the driving mechanism 37 rotates the right rotary shade 36 to the rotational position R1 illustrated in FIG. 6A, the third connecting portion 36e and the upper edge of the cylindrical portion 36d1 are projected to the front side of the projection lens 34 as the horizontal cutoff line 61. Further, the first edge portion 36d4 which is a part of the second spiral surface 36d3 is projected to the front side of the projection lens 34 as the inclined cutoff line 64. Light passing above the right rotary shade 36 and through the space 36k illuminates the areas below the horizontal cutoff line 61 and the right area of the inclined cutoff line 64 above the horizontal cutoff line 61, as the right partial high beam pattern PH1.

FIG. 6B illustrates a state of the right rotary shade 36, which is further rotated to the rotational position R2 toward the rear side of the vehicle 10 from the state of the rotational position R1 illustrated in FIG. 6A, when viewed from the front side of the vehicle 10.

In the state illustrated in FIG. 6B, the outer peripheral portion of the third connecting portion 36e, the outer peripheral portion of the cylindrical portion 36d1 of the second connecting portion 36d, and the second edge portion 36d5 that is obliquely formed appear on the upper end portion of the right rotary shade 36.

The light distribution pattern illustrated in FIG. 6E is formed as the outer peripheral portion of the third connecting portion 36e, the cylindrical portion 36d1, and the second edge portion 36d5 are projected to an imaginary vertical screen which is disposed ahead of the vehicle 10. This light distribution pattern corresponds to a right partial high beam pattern PH2 and has an illuminated area which is larger than that of the right partial high beam pattern PH1 or a right low beam pattern and narrower than that of a right high beam pattern.

The right partial high beam pattern PH2 includes a horizontal cutoff line 61 and an inclined cutoff line 64.

The horizontal cutoff line 61 is formed by the third connecting portion 36e and the upper edge of the cylindrical portion 36d1 to extend horizontally slightly below the horizontal line H-H, and used as a cutoff line for an own lane side.

The inclined cutoff line 64 is formed by the second edge portion 36d5 which is disposed at the boundary between the first spiral surface 36d2 and the second spiral surface 36d3, and extends obliquely toward the right upper side from the vicinity of the line V-V at the right end of the horizontal cutoff line 61.

As illustrated in FIG. 6B, a space 36k which enables light to pass therethrough is formed in the left side of the second edge portion 36d5 when viewed from the driver's seat. Light which has passed through the space 36k illuminates the right area of the inclined cutoff line 64 as illustrated in FIG. 6E.

That is, when the driving mechanism 37 rotates the right rotary shade 36 to the rotational position R2 (R2>R1) illustrated in FIG. 6B, the third connecting portion 36e and the upper edge of the cylindrical portion 36d1 are projected to the front side of the projection lens 34 as the horizontal cutoff line 61. Further, the second edge portion 36d5 is projected to the front side of the projection lens 34 as the inclined cutoff line 64. Light passing above the right rotary shade 36 and through the space 36k illuminates the areas below the horizontal cutoff line 61 and the right area of the inclined cutoff line 64 above the horizontal cutoff line 61, as the right partial high beam pattern PH2.

As the right rotary shade 36 rotates from the state illustrated in FIG. 6A to the state illustrated in FIG. 6B, a part of the second spiral surface 36d3 which is projected as the inclined cutoff line 64 shifts from the first edge portion 36d4 to the second edge portion 36d5 and gradually approaches the third connecting portion 36e. Accordingly, the space 36k through which light can pass gradually expands. Consequently, the inclined cutoff line 64 gradually moves to the left side thereby increasing the illuminated area of the right side of the inclined cutoff line 64. As a result, the horizontal cutoff line 61 is gradually shortened.

FIG. 6C illustrates a state of the right rotary shade 36 which is further rotated from the rotational position R2 illustrated in FIG. 6B to the rotational position R3 toward the rear side of the vehicle 10, when viewed from the front side of the vehicle 10.

In the state illustrated in FIG. 6C, the outer peripheral portion of the third connecting portion 36e, the outer peripheral portion of the cylindrical portion 36d1 of the second connecting portion 36d, and the third edge portion 36d6 that is obliquely formed appear on the upper end portion of the right rotary shade 36.

The light distribution pattern illustrated in FIG. 6F is formed as the outer peripheral portion of the third connecting portion 36e, the cylindrical portion 36d1, and the third edge portion 36d6 are projected to an imaginary vertical screen which is disposed ahead of the vehicle 10. This light distribution pattern corresponds to a right partial high beam pattern PH3 and has an illuminated area which is larger than those of the right partial high beam pattern PH1, the right partial high beam pattern PH2, and a right low beam pattern, and narrower than that of a right high beam pattern.

The right partial high beam pattern PH3 includes a horizontal cutoff line 61 and an inclined cutoff line 64.

The horizontal cutoff line 61 is formed by the third connecting portion 36e and the upper edge of the cylindrical portion 36d1 to extend horizontally slightly below the horizontal line H-H, and used as a cutoff line for an own lane side.

The inclined cutoff line 64 is formed by the third edge portion 36d6 which is a part of the first spiral surface 36d2 and extends obliquely toward the right upper side from the right end of the horizontal cutoff line 61.

As illustrated in FIG. 6C, a space 36k which enables light to pass therethrough is formed in the left side of the third edge portion 36d6 when viewed from the driver's seat. Light which has passed through the space 36k illuminates the right area of the inclined cutoff line 64 as illustrated in FIG. 6F.

That is, when the driving mechanism 37 rotates the right rotary shade 36 to the rotational position R3 (R3>R2) illustrated in FIG. 6C, the third connecting portion 36e and the upper edge of the cylindrical portion 36d1 are projected to the front side of the projection lens 34 as the horizontal cutoff line 61. Further, the third edge portion 36d6 is projected to the front side of the projection lens 34 as the inclined cutoff line 64. Light passing above the right rotary shade 36 and through the space 36k illuminates the areas below the horizontal cutoff line 61 and the right area of the inclined cutoff line 64 above the horizontal cutoff line 61, as the right partial high beam pattern PH3.

As the right rotary shade 36 rotates from the state illustrated in FIG. 6B to the state illustrated in FIG. 6C, a part of the first spiral surface 36d2 which is projected as the inclined cutoff line 64 shifts from the second edge portion 36d5 to the third edge portion 36d6 and gradually approaches the third connecting portion 36e. Accordingly, the space 36k which enables light to pass therethrough gradually becomes wider. Consequently, the inclined cutoff line 64 gradually moves to the left side thereby increasing the illuminated area of the right side of the inclined cutoff line 64. As a result, the horizontal cutoff line 61 is gradually shortened.

In all the above-described right partial high beam patterns PH1 to PH3, the shape of the inclined cutoff line 64 (e.g., the angle formed with the horizontal line H-H) does not largely change. As will be described later, this phenomenon is one of the effects that results from the configuration of the second connecting portion 36d having the nonlinearly changing spiral end surfaces in the right rotary shade 36 according to the present exemplary embodiment. In other words, when the configuration of the second connecting portion 36d is not conceived, the shape of the inclined cutoff line 61 in the right partial high beam patterns PH1 to PH3 gradually changes for the reasons described below.

Figure 7:
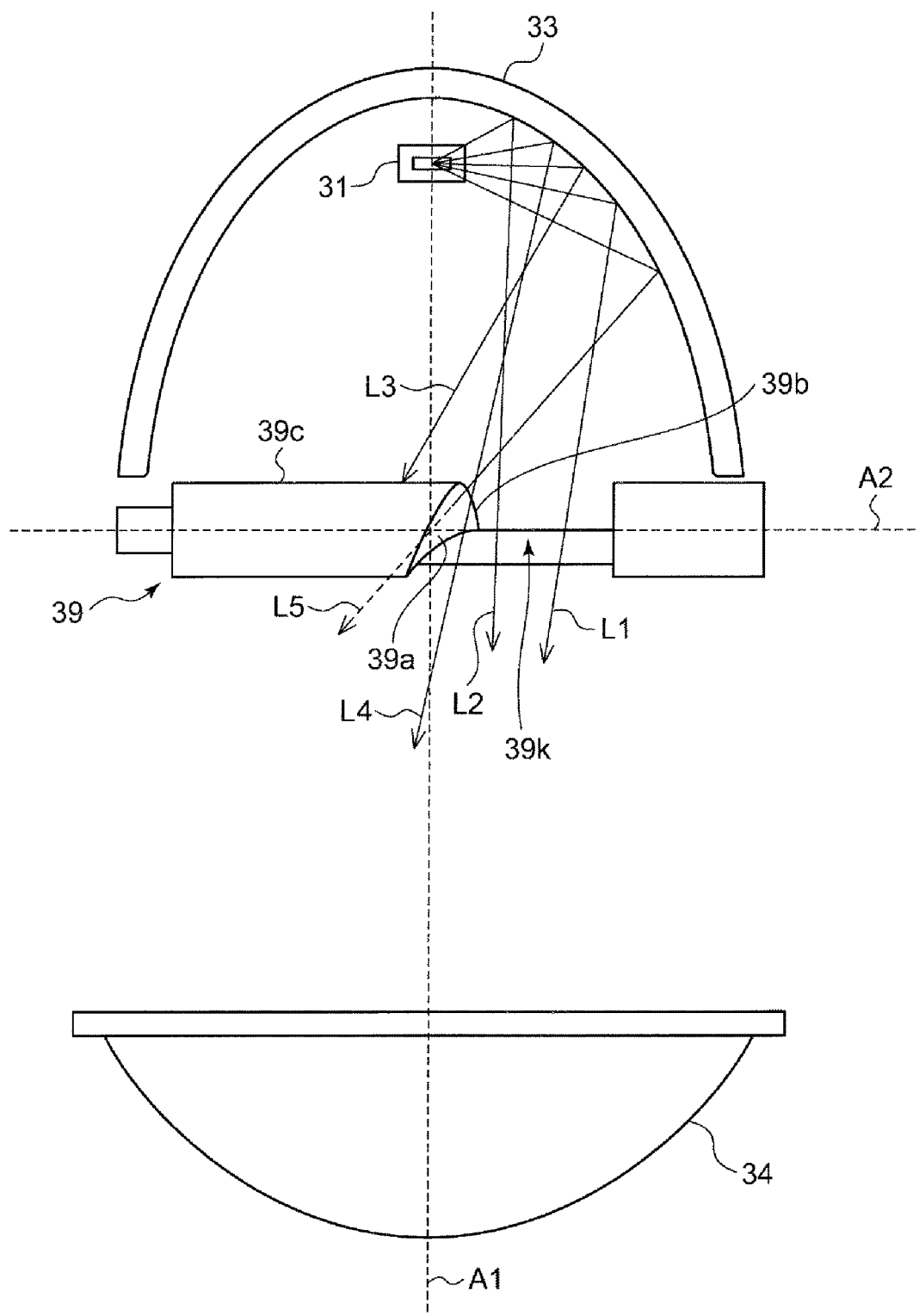
FIG. 7 is a schematic view for describing a phenomenon that shapes of inclined cutoff lines of right partial high beam patterns PH1 to PH3 gradually change in relation to the rotational positions of the right rotary shade.

FIG. 7 is a schematic view for describing a phenomenon that the shape of the inclined cutoff line 64 in the right partial high bean patterns PH1 to PH3 gradually changes in relation with the rotational position of the right rotary shade.

As illustrated in FIG. 7, light which is emitted from the light source 31 and reflected by the reflector 33 passes through the focal point of the reflector 33 and travels toward the projection lens 34 from various directions. Especially, at this time, light which largely affects a quantity of light incident on the projection lens 34 is the light which is incident directly on the projection lens 34 without passing through the focal point of the reflector 33 (e.g., light beams L1 and L2 illustrated in FIG. 7). Specifically, this light refers to the light which passes through the space 39k to travel toward the optical axis A1 from the rear side of the rear focal point F of the projection lens 34.

Here, in FIG. 7, a part of the light shielding portion is a spiral surface 39a that is configured to enable a change of a position of an edge portion 39*b* to be projected as a cutoff line to become linear in relation to a change of a rotational position of a right rotary shade 39. A part of the light reflected by the reflector 33 (a light beam L3 illustrated in FIG. 7) is blocked by the edge portion 39*b* of the spiral surface 39*a* or a cylindrical portion 39*c*, and another part thereof (a light beam L4 illustrated in FIG. 7) passes so as to form an inclined cutoff line 64.

Meanwhile, a part of light which reaches the space 39*k* without being blocked by the edge portion 39*b* of the spiral surface 39*a* (a light beam L5 illustrated in FIG. 7) is blocked by the spiral surface 39*a*. As a result, for example, an inclined cutoff line 64' is formed as illustrated in FIG. 6D. Meanwhile, in the right rotary shade 36 according to the present exemplary embodiment, the inclined cutoff line 64 which is represented by a solid line is formed as the first edge portion 36*d*4 is projected to the front side.

That is, in the configuration illustrated in FIG. 7, light is blocked by the spiral surface 39*a* so that the luminance near the inclined cutoff line 64 decreases, and the inclined cutoff line 64' is formed as an outline of a partial edge portion of the spiral surface 39*a* is projected. Especially, since light incident from the direction of the light beam L5 which largely affects the quantity of light incident on the projection lens 34 is blocked by the spiral surface 39*a*, the luminance near the boundary of the non-illuminated area largely decreases, and the boundary becomes vague.

Meanwhile, since the right rotary shade 36 according to the present exemplary embodiment is configured such that a change of a position of the edge portion to be projected as a cutoff line becomes nonlinear in relation to a change of a rotational position of the right rotary shade 36, the quantity of light which passes near the edge portion but is blocked by the spiral surface may be restricted. Accordingly, as intended originally, the first edge portion 36*d*4 may be projected to the front side as an inclined cutoff line 64.

The same phenomenon may occur as the inclined cutoff line 64' in the right partial high beam pattern PH2 illustrated in FIG. 6E or the inclined cutoff line 64' in the right partial high beam pattern PH3 illustrated in FIG. 6F. Especially, when the right rotary shade 39 of FIG. 7 rotates so that the light shielding portion moves to the right side of the vehicle thereby increasing the width of the space 39*k*, the light having a large angle with respect to the optical axis A1 increases among light which reaches the space 39*k*.

The light having a large angle with respect to the optical axis A1 is more likely to be blocked by the spiral surface 39*a*. Thus, like the inclined cutoff line 64' in the right partial high beam pattern PH2 illustrated in FIG. 6E or the inclined cutoff line 64' in the right partial high beam pattern PH3 illustrated in FIG. 6F, the area where the luminance decreases near the inclined cutoff line 64 increases, and the angle formed between the inclined cutoff line 64' and the horizontal direction H-H is gradually reduced.

However, in the right rotary shade 36 according to the present exemplary embodiment, the angle formed between the inclined cutoff line 64 and the horizontal direction H-H does not largely change as illustrated in FIGS. 6D to 6F. Accordingly, it is possible to suppress a driver from feeling uncomfortable with a movement or a shape change of an inclined cutoff line 64 in relation to a change of the rotational position of the right rotary shade 36.

Figure 8A:
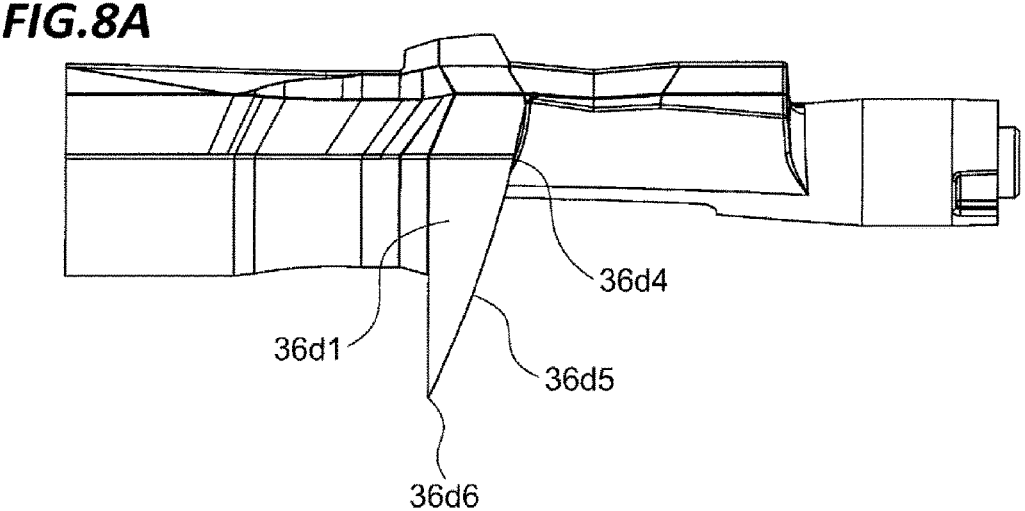
FIG. 8A is a schematic view obtained by developing, in a planar form, an outer peripheral surface of a cylindrical portion of the second connecting portion of the right rotary shade.
Figure 8B:
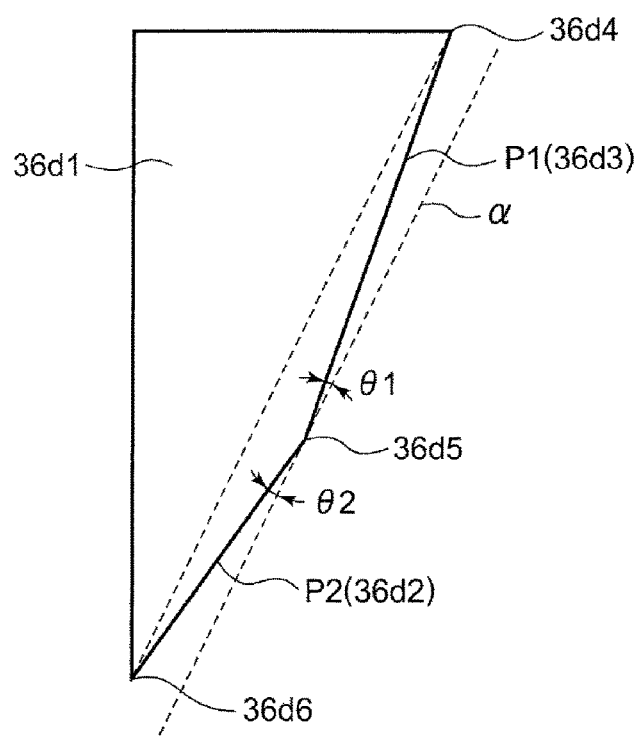
FIG. 8B is an enlarged view of the outer peripheral surface of the cylindrical portion of FIG. 8A.
Figure 9:
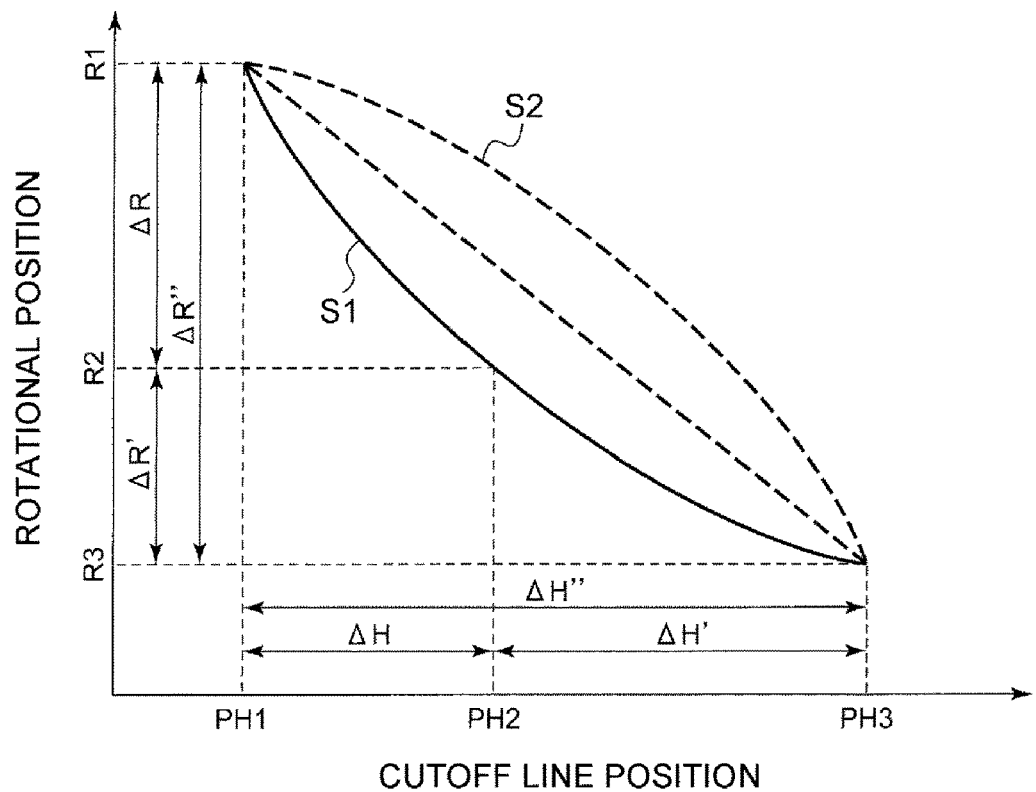
FIG. 9 is a view illustrating a positional relationship between a rotational position R of a light shielding portion and an inclined cutoff line in a right partial high beam pattern.

Hereinafter, more detailed descriptions will be made on the configuration of the light shielding portion of the right rotary shade 36 according to the present exemplary embodiment. FIG. 8A is a schematic view obtained by developing, in a planar form, the outer peripheral surface of the cylindrical portion 36*d*1 of the second connecting portion 36*d* of the right rotary shade 36, and FIG. 8B is an enlarged view of the outer peripheral surface of the cylindrical portion 36*d*1 of FIG. 8A. FIG. 9 is a view illustrating a positional relationship between a rotational position R of the light shielding portion and a position of an inclined cutoff line in a right partial high beam pattern.

As described above, the cylindrical portion 36*d*1 of the second connecting portion 36*d* which functions as the light shielding portion is configured such that a right partial high beam pattern PH1, a right partial high beam pattern PH2, and a right partial high beam pattern PH3 can be formed as the plurality of light distribution patterns. Further, the cylindrical portion 36*d*1 includes the first edge portion 36*d*4 that is projected as the inclined cutoff line 64 of the right partial high beam pattern PH1 in the first rotational position R1 of the right rotary shade 36, the second edge portion 36*d*5 that is projected as the inclined cutoff line 64 of the right partial high beam pattern PH2 in the second rotational position R2 (R1<R2) of the right rotary shade 36 which is further rotated from the first rotational position R1, and the third edge portion 36*d*6 that is projected as the inclined cutoff line of the right partial high beam pattern PH3 in the third rotational position R3 (R2<R3) of the right rotary shade 36 which is further rotated from the second rotational position R2.

In addition, the cylindrical portion 36*d*1 is configured such that a ratio $\Delta H/\Delta R$ of a quantity $\Delta H$ of a change from the first edge portion 36*d*4 to the second edge portion 36*d*5 in a direction of a rotating axis to a quantity $\Delta R$ of a rotational change from the second rotational position R1 to the second rotational position R2 is different from a ratio $\Delta H'/\Delta R'$ of a quantity of a change from the second edge portion 36*d*5 to the third edge portion 36*d*6 in the direction of the rotating axis to a quantity $\Delta R'$ of a rotational change from the second rotational position R2 to the third rotational position R3.

As described above, the cylindrical portion 36*d*1 functioning as the light shielding portion is configured such that an area illuminated by the right partial high beam pattern PH2 becomes larger than an area illuminated by the right partial high beam pattern PH1 and narrower than an area illuminated by the right partial high beam pattern PH3. Further, as represented by the line S1 in FIG. 9, the light shielding portion is configured to meet the condition of the ratio $\Delta H/\Delta R$<the ratio $\Delta H'/\Delta R'$. Accordingly, when forming, for example, the right partial high beam pattern PH2, the shape of the inclined cutoff line 64 may be suppressed from changing as the third edge portion 36*d*6 corresponding to the inclined cutoff line 64 of the right partial high beam patter PH3 is projected.

In addition, as represented by the line S2 in FIG. 9, the cylindrical portion 36*d*1 may be configured such that the ratio $\Delta H/\Delta R$ of a quantity $\Delta H$ of a change from the first edge portion 36*d*4 to the second edge portion 36*d*5 in the direction of the rotating axis to a quantity $\Delta R$ of a rotational change from the first rotational position R1 to the second rotational position R2 becomes larger than the ratio $\Delta H'/\Delta R'$ of a quantity $\Delta H'$ of a change from the second edge portion 36*d*5 to the third edge portion 36*d*6 in the direction of the rotating axis to a quantity $\Delta R'$ of a rotational change from the second rotational position R2 to the third rotational position R3. In this case, while the quantity of light blocked by the edge portions of the light shielding portion increases, light blocked by the spiral surface is reduced. Therefore, the movement of the inclined cutoff line is further facilitated (a shape change is reduced), and the uncomfortable feeling of the driver may be further suppressed.

As illustrated in FIG. 8B or FIG. 9, the cylindrical portion 36d1 is configured such that, assuming that a spiral surface which has a constant ratio ΔH"/ΔR" of a quantity ΔH" of a change from the first edge portion 36d4 to the third edge portion 36d6 in the direction of the rotating axis to a quantity ΔR" of a rotational change from the first rotational position R1 to the third rotational position R3 is an imaginary surface α, an angle θ1 formed between a first light shielding surface P1 extending from the first edge portion 36d4 to the second edge portion 36d5 and the imaginary surface α is equal to or less than an angle θ2 formed between a second light shielding surface P2 extending from the second edge portion 36d5 to the third edge portion 36d6. Accordingly, in the right partial high beam patterns PH2 and PH3, the generation of the inclined cutoff line 64' may be suppressed so that it becomes easy to form a desired inclined cutoff line 64.

Figure 10:
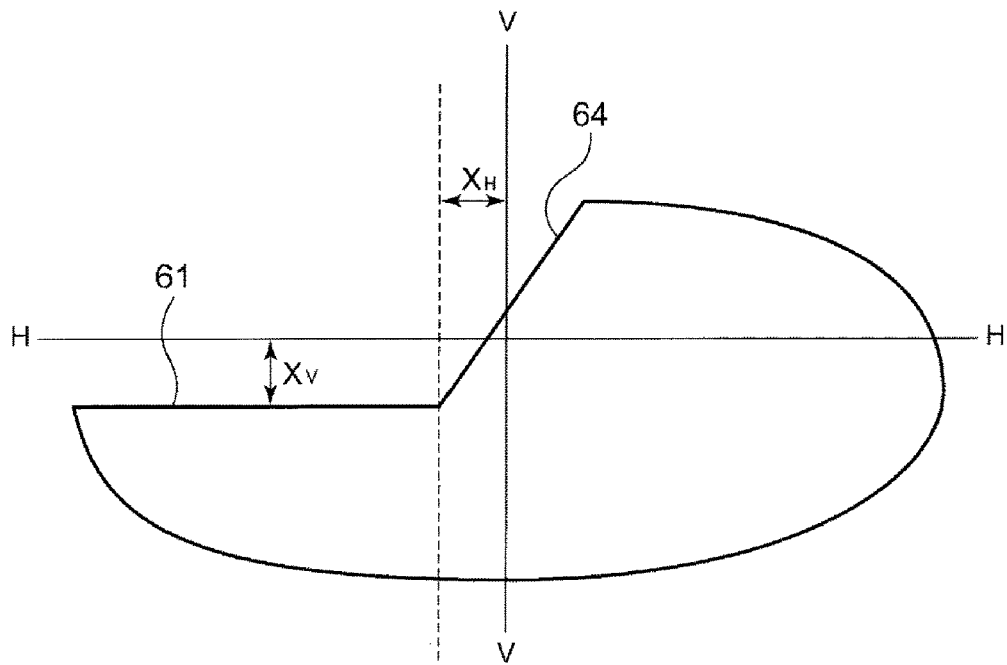
FIG. 10 is a schematic view for describing a positional relationship between an optical axis and a lower end of a cutoff line.

FIG. 10 is a schematic view for describing a positional relationship between an optical axis and a lower end of a cutoff line. According to the present exemplary embodiment, the optical system includes the projection lens 34, and the right rotary shade 36 is disposed near the focal point F of the projection lens 34. The light shielding portion of the cylindrical portion 36d1 is a light shielding surface (the first spiral surface 36d2 and the second spiral surface 36d3) which is curved about the second edge portion 36d5 and is configured such that a lower end of the inclined cutoff line 64 which is formed ahead of a vehicle when the second edge portion 36d5 is projected in the second rotational position R2 is disposed in a range of $\pm X_H °$ in a horizontal direction based on an optical axis (see FIG. 10). Accordingly, the inclined cutoff line 64 near the optical axis may be formed accurately. Further, $X_H$ may be set to be equal to or less than an angular difference $X_V$ between the line H-H and the horizontal cutoff line 61. $X_V$ is set to, for example, 0.57° or less. In this case, $X_H$ is preferably 0.57 or less.

The foregoing descriptions may be applied to the left lamp unit 30L by appropriately changing the left and right directions.

Further, the spiral light shielding surface of the light shielding portion according to the present exemplary embodiment may not be mathematically strictly spiral and may be inclined, curved, or bent as long as it exhibits the acting effects of the present disclosure. Further, the spiral light shielding surface may not be continuous and may have a stepped or discontinuous area.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle lamp unit comprising:
    an optical system configured to form a light distribution pattern ahead of a vehicle; and
    a rotary light shielding member rotatable around a rotational axis thereof, and including a light shielding portion having a side surface continuously formed by a plurality of spiral surfaces where a plurality of edge portions are formed, and configured to block at least a part of light emitted from a light source,
    wherein the plurality of spiral surfaces of the light shielding portion are formed to approach toward a left end of the rotary light shielding member, respectively, while rotating the rotary light shielding member toward a rear side of the vehicle around the rotational axis thereof when viewed in a front side of the vehicle, such that a blocked quantity of light emitted from the light source by the rotary light shielding member is changed,
    the light shielding portion is configured to form a plurality of light distribution patterns including an inclined cutoff line extending in a direction that crosses a horizontal line, and a horizontal cutoff line connected to the inclined cutoff line, respectively such that a position of the inclined cutoff line moves along the horizontal line, while rotating the rotary light shielding member around the rotational axis, and
    the light shielding portion is configured such that a change of a position of each of the plurality of edge portions of the side surface that is projected as the inclined cutoff line in a direction of the rotational axis of the rotary light shielding member becomes nonlinear in relation to a change of a rotational position of the rotary light shielding member while rotating the rotary light shielding member around the rotational axis thereof.

2. The vehicle lamp unit of claim 1, wherein the plurality of light distribution patterns includes a first light distribution pattern, a second light distribution pattern, and a third light distribution pattern,
    the plurality of edge portions of the side surface includes:
    a first edge portion that is projected as a first inclined cutoff line of the first light distribution pattern in a first rotational position R1 of the rotary light shielding member;
    a second edge portion that is projected as a second inclined cutoff line of the second light distribution pattern in a second rotational position R2 (R1<R2) of the rotary light shielding member which is further rotated from the first rotational position R1; and
    a third edge portion that is projected as a third inclined cutoff line of the third light distribution pattern in a third rotational position R3 (R2<R3) of the rotary light shielding member which is further rotated from the second rotational position R2, and
    the light shielding portion is configured such that a ratio ΔH/ΔR defined by a change ΔH from the first edge portion to the second edge portion in a direction of the rotational axis to a rotational change ΔR from the second rotational position R1 to the second rotational position R2, is different from a ratio ΔH'/ΔR' defined by a change ΔH' from the second edge portion to the third edge portion in the direction of the rotational axis to a rotational change ΔR' from the second rotational position R2 to the third rotational position R3.

3. The vehicle lamp unit of claim 2, wherein the light shielding portion is configured such that an area illuminated by the second light distribution pattern becomes larger than an area illuminated by the first light distribution pattern and narrower than an area illuminated by the third light distribution pattern, and meets a condition of the ratio ΔH/ΔR<the ratio ΔH'/ΔR'.

4. The vehicle lamp unit of claim 2, wherein the light shielding portion is configured such that, assuming that a spiral surface which has a constant ratio ΔH"/ΔR" defined by a change ΔH" from the first edge portion to the third edge portion in the direction of the rotational axis to a rotational change ΔR" from the first rotational position R1 to the third rotational position R3 is an imaginary surface α, an angle θ1 formed between a first light shielding surface P1 extending from the first edge portion to the second edge portion and the imaginary surface α is equal to or less than an angle θ2 formed between a second light shielding surface P2 extending from the second edge portion to the third edge portion and the imaginary surface α.

5. The vehicle lamp unit of claim 3, wherein the light shielding portion is configured such that, assuming that a spiral surface which has a constant ratio ΔH"/ΔR" of a change ΔH" from the first edge portion to the third edge portion in the direction of the rotational axis to of a rotational change ΔR" from the first rotational position R1 to the third rotational position R3 is an imaginary surface α, an angle θ1 formed between a first light shielding surface P1 extending from the first edge portion to the second edge portion and the imaginary surface α is equal to or less than an angle θ2 formed between a second light shielding surface P2 extending from the second edge portion to the third edge portion and the imaginary surface α.

6. The vehicle lamp unit of claim 2, wherein the optical system includes a projection lens,
the rotary light shielding member is disposed near a focal point of the projection lens, and
the side surface of the light shielding portion serves as a light shielding surface which is curved about the second edge portion, and is configured such that a lower end of the second inclined cutoff line which is formed ahead of a vehicle when the second edge portion is projected in the second rotational position R2 is disposed in a range of $\pm X_H°$ in a horizontal direction with reference to an optical axis of the projection lens [wherein $X_H$ is equal to or less than an angular difference $X_V$ between the lower end of the second inclined cutoff line and a line H-H (a horizontal line)].

7. The vehicle lamp unit of claim 3, wherein the optical system includes a projection lens,
the rotary light shielding member is disposed near a focal point of the projection lens, and
the side surface of the light shielding portion serves as a light shielding surface which is curved about the second edge portion, and is configured such that a lower end of the second inclined cutoff line which is formed ahead of a vehicle when the second edge portion is projected in the second rotational position R2 is disposed in a range of $\pm X_H°$ in a horizontal direction with reference to an optical axis of the projection lens [wherein $X_H$ is equal to or less than an angular difference $X_V$ between the lower end of the second inclined cutoff line and a line H-H (a horizontal line)].

8. The vehicle lamp unit of claim 4, wherein the optical system includes a projection lens,
the rotary light shielding member is disposed near a focal point of the projection lens, and
the side surface of the light shielding portion serves as a light shielding surface which is curved about the second edge portion, and is configured such that a lower end of the second inclined cutoff line which is formed ahead of a vehicle when the second edge portion is projected in the second rotational position R2 is disposed in a range of $\pm X_H°$ in a horizontal direction with reference to an optical axis of the projection lens [wherein $X_H$ is equal to or less than an angular difference $X_V$ between the lower end of the second inclined cutoff line and a line H-H (a horizontal line)].

9. The vehicle lamp unit of claim 5, wherein the optical system includes a projection lens,
the rotary light shielding member is disposed near a focal point of the projection lens, and
the side surface of the light shielding portion serves as a light shielding surface which is curved about the second edge portion, and is configured such that a lower end of the second inclined cutoff line which is formed ahead of a vehicle when the second edge portion is projected in the second rotational position R2 is disposed in a range of $\pm X_H°$ in a horizontal direction with reference to an optical axis of the projection lens [wherein $X_H$ is equal to or less than an angular difference $X_V$ between the lower end of the second inclined cutoff line and a line H-H (a horizontal line)].

10. A rotary light shielding member that is rotatable around a rotational axis thereof and blocks at least a part of light emitted from a light source in a vehicle lamp unit, the rotary light shielding member comprising:
a light shielding portion having a side surface continuously formed by a plurality of spiral surfaces where a plurality of edge portions are formed,
wherein the plurality of spiral surfaces of the light shielding portion are formed to approach toward a left end of the rotary light shielding member, respectively, while rotating the rotary light shielding member toward a rear side of the vehicle around the rotational axis thereof when viewed in a front side of the vehicle, such that a blocked quantity of light emitted from a light source by the rotary light shielding member is changed,
wherein the light shielding portion is configured to form a plurality of light distribution patterns including an inclined cutoff line extending in a direction that crosses a horizontal line, and a horizontal cutoff line connected to the inclined cutoff line, respectively such that a position of the inclined cutoff line moves along the horizontal line, while rotating the rotary light shielding member around the rotational axis, and
the light shielding portion is configured such that a change of a position of each of the plurality of edge portions of the side surface that is projected as the inclined cutoff line in a direction of the rotational axis of the rotary light shielding member becomes nonlinear in relation to a change of a rotational position of the rotary light shielding member while rotating the rotary light shielding member around the rotational axis thereof.

11. The vehicle lamp unit of claim 2, wherein the light shielding portion is configured to meet a condition of the ratio ΔH/ΔR>the ratio ΔH'/ΔR'.

12. The vehicle lamp unit of claim 6, wherein the angular difference $X_V$ is set to 0.57° or less.

13. The vehicle lamp unit of claim 7, wherein the angular difference $X_V$ is set to 0.57° or less.

14. The vehicle lamp unit of claim 8, wherein the angular difference $X_V$ is set to 0.57° or less.

15. The vehicle lamp unit of claim 9, wherein the angular difference $X_V$ is set to 0.57° or less.

* * * * *